United States Patent [19]

Blonder

[11] 4,268,860
[45] May 19, 1981

[54] TELEVISION SUBSCRIBER APPARATUS

[75] Inventor: Isaac S. Blonder, Locust, N.J.

[73] Assignee: Blonder-Tongue Laboratories, Inc., Old Bridge, N.J.

[21] Appl. No.: 509,302

[22] Filed: Sep. 25, 1974

[51] Int. Cl.³ .............................................. H04N 7/16
[52] U.S. Cl. ................................... 358/118; 358/114; 455/286
[58] Field of Search ................. 178/5.1; 325/132, 483, 325/477; 358/114, 118; 455/286

[56] References Cited

U.S. PATENT DOCUMENTS

| 3,504,109 | 3/1970 | Spencer | 178/5.1 |
| 3,514,530 | 5/1970 | Simons | 178/5.1 |
| 3,813,482 | 5/1974 | Blonder | 178/5.1 |
| 3,859,457 | 1/1975 | Kirk, Jr. | 325/132 |

Primary Examiner—Stephen C. Buczinski
Attorney, Agent, or Firm—Rines and Rines, Shapiro and Shapiro

[57] ABSTRACT

This disclosure is concerned with modulating the tuning of a picture carrier frequency trap to insure audible distortion of the sound signal in a subscriber television system irrespective of variations in circuit parameters caused by temperature or other changing tuning adjustments of the trap.

3 Claims, 1 Drawing Figure

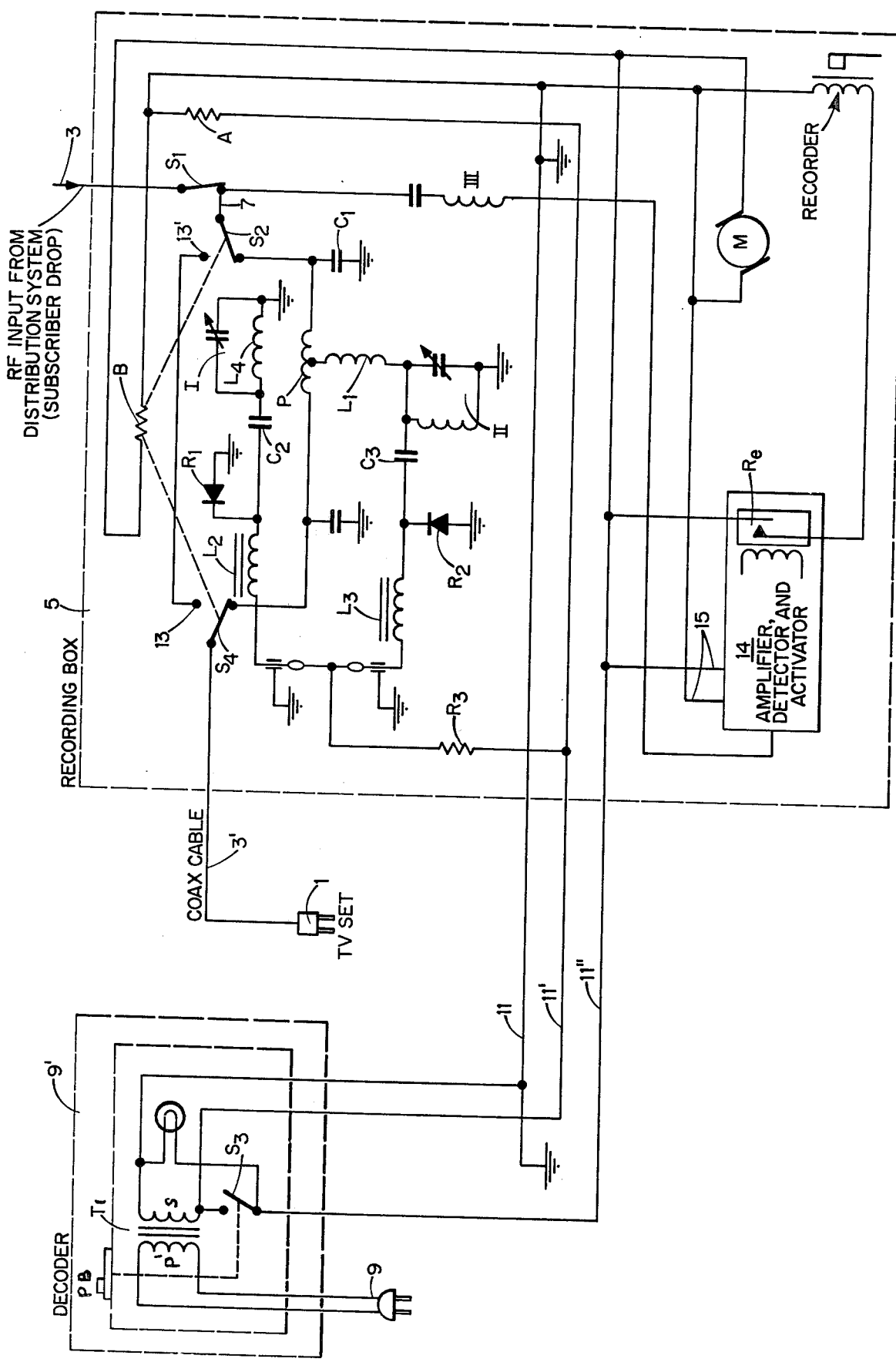

TELEVISION SUBSCRIBER APPARATUS

The present invention relates to television subscriber apparatus and, more particularly, to systems in which it is desired, by scrambling, to prevent the reception of a particular television program except by subscribers to a predetermined television service; the invention also being applicable, in its novel aspects, to other similar or related applications wherein the desired results are sought.

Prior-art proposals have involved the use of ancillary subscription equipment whereby special signals are transmitted along telephone or other lines, and, upon reception, serve to clarify a picture signal transmitted in distorted form, thereby to enable the subscriber to hear an undistorted subscription program. Various ramifications of this basic type of system have been operated in tests and in limited practice with varying degrees of success; but they have all been quite costly in the quantity and nature of specialized equipment and, generally, in the necessity for the transmission of special kinds of coding or other signals to aid in the process of rendering pictures unintelligible to nonsubscribers and intelligible to subscribers.

Various approaches for different types of applications are described, for example, in U.S. Pat. No. 3,813,482 and reference cited therein.

A much more simplified and far less costly system, however, involving a narrow band network that is employed for tuning substantially to the picture carrier frequency, with means for optionally inserting the network into circuit with the receiver to render the picture unintelligible, is described in my earlier U.S. Pat. No. 3,175,033. The network trap is rather critically designed to provide sufficient attenuation at the said picture carrier frequency to reduce the input signal level at the television discriminator circuit below its threshold value, thereby rendering the discriminator incapable of rejecting amplitude modulation and thus distorting the sound signal. Such devices, while satisfactory, have relied upon the relatively accurate tuning of the network to render the sound unintelligible. Since the network greatly reduces the video carrier frequency, the output of the video detector of the television receiver is controlled by the reduced amplitude of the picture signal. A distorted sound signal is thus produced; whereas, in the absence of the network, a substantially pure frequency-modulation-discriminated audio signal is reproduced, providing an undistorted sound signal.

In some applications, particularly where the apparatus must be operated out-of-doors, as in a recording box affixed to the residence of the subscriber, temperature changes and variations in the critical adjustment of the network have been found inadequately to distort the sound signal, though the picture signal is relatively unintelligible.

An object of the present invention, accordingly, is to provide a mechanism of the above-described character that does not require such critical tuning of the network trap and that, to the contrary, provides for insurance of the distortion of the sound irrespective of slight tuning changes of the network with temperature variations or other changes of conditions.

A further object of the present invention is to provide a new and improved television subscriber equipment more particularly, though not exclusively, useful for cable television and the like.

Other and further objects will be explained hereinafter, and are more particularly delineated in the appended claims. In summary, however, the invention contemplates producing an audio-frequency modulation upon the tuning of the before-mentioned network trap to insure audible distortion of the sound signal irrespective of wide variations in circuit parameters caused by changing conditions of this tuning adjustment or the like.

The invention will now be described in connection with the accompanying drawing, the single FIGURE of which is a schematic circuit and block diagram illustrating the invention in preferred form.

Referring to the drawing, a television set 1 receives the subscriber television signal from a distribution center along input path 3, by way of, for example, a coaxial cable or other input 3'. Interposed in this path between the inputs 3 and 3' is a recording box 5 (which may be located external to the residence of the subscriber, if desired), containing a network trap, for example, of the type described in my said prior patent. The trap is shown comprising a pair of inductance-capacitance networks I and II tuned to the picture carrier frequency, respectively in series and shunt, to afford substantially 60-decibel cancellation of the picture carrier frequency. The input conductor 3 is traceable to a switch S1 which, in accordance with the preferred embodiment of the invention, is a thermal switch of a thermal relay operated by a later-described heating element A. The input signal continues along conductor 7 through a further preferably thermal relay switch S2 (shown by means of dotted-line connection controlled by a further heater element B) to a transformer primary winding P coupled to the inductance L4 of the trap network I to provide series resonance rejection of the picture carrier frequency. The primary P is also connected from an intermediate tap through an inductance L1 to the top of network II to provide for rejection by the shunt resonance circuit II. Capacitor C1 is a matching or balancing capacitor.

Across the tuned circuit I, two capacitors are effectively connected in series; namely, capacitor C2 and the capacitive varactor diode or similar electrically controllable and variable capacitive impedance device R1. Similarly, in shunt with the trap II, is a similar pair of capacitors comprising capacitor C3 and the varactor or similar voltage-variable capacitance R2. In accordance with the present invention, alternating current is applied from a transformer T1 to adjust the capacitance value of R1 and R2 through respective isolating chokes L2 and L3 which are, in turn, connected through a dropping resistor R3 via conductors 11'—11 to the transformer secondary S. The primary of T1 connects to the main power line at the plug 9 and the step-down secondary S may produce, say, 24 volts of alternating-current 60-cycle voltage. Transformer T1 may be termed the decoder 9', and a controlling of switch S3, connected to the secondary S, enables the television subscriber to be connected through the recording box 5 to the subscriber service along input conductor 3, as follows. The conductor 11 is shown grounded and connected to the upper end of the secondary winding S of the 24-volt transformer T1. The conductor 11', on the other hand, is always "hot" during the operation of the system, being connected to the lower terminal of the secondary winding S and to the resistor R3 that supplies the alternating current through chokes L2 and L3 to vary the capacitances diodes or varactors R1 and R2 in accordance with the alternating-current signal. In addition, the conductor 11' is shown heating the heater A only. When switch S3 is closed, as by depressing push-button PB when the subscriber desires the pay television program, heater B becomes heated along conductor 11'', actuating the switches S2 and S4 from the positions shown to the respective contactor terminals 13' and 13, disconnecting the traps I and II from the input line 3 and from the coaxial cable input 3' to the television set, and at the same time permitting the signal to come along conductor 3 through the closed relay S1, along S2 as it engaged contactor 13', thus by-passing the traps I and II, and thence through switch S4 to the coaxial cable input 3'. This provides ordinary undistorted reception of the pay television program signals that may be on the line. Opening of the switch S3 causes the return to the circuit conditions illustrated, wherein the traps I and II are inserted in the line from 3 to 3' and thus distort the picture and apply the distorting audible 60-cycle buzz modulation upon the sound signals, as before described.

The swinging or modulating of the tuning of the traps through the use of the 24-volt alternating current variation applied to varactors R1 and R2 is thus employed, in accordance with the invention, to overcome the sensitivity of the tuning of the traps I and II to the picture carrier frequencies for successful distortion of the sound, as previously explained. Even swings of frequencies of the order of 25 kilocycles, produced by the 24-volt, 60-cycle alternating modulating current at picture carrier frequency of say 83. 25 megacycles (channel 6 of the VHF band), have been found effectively to insure adequate distortion of the sound, despite even the fact that traps I and II may not be exactly tuned to the picture carrier frequency; and such operation has been found to compensate for variances in temperature that have been found to take place particularly when the recording box 5 is external to the subscriber's residence.

In order to keep track of the subscriber program being transmitted and to enable recording of the time of use of the subscriber's service, a further signal may be transmitted along the distribution line 3 such as, in the above illustration, a 73.25 megacycle–10,000 cycle per second modulation coded audio signal, which is filtered out and recovered from the input signal by means of a series trap III comprising series capacitance and resistance connected also to the input line 3. The coded signal is shown applied to an amplifier protector system 14, the output of which is shown operating a sealed electromagnetic-controlled relay switch, such as a reed relay Re, that pulses opened and closed in response to the 10,000 cycle code on, for example, the 73.25 megacycle signal. This binary coded opening and closing of the relay Re identifies the program being transmitted. The opening and closing of the relay Re also serves in accordance with the present invention for operating an electromagnetically controlled recorder, so labeled, to produce indications of the binary code on a wax or other heat sensitive or other kind of recording paper or tape for the purpose of making a record of the reception by the subscriber of the subscriber signal. A motor M is energized through conductor 11'' from the 24-volt decoder system 9' to start a timer mechanism that rolls the paper or tape of the recorder forward to permit this recording of the code, and thus not only to identify the program but to indicate the time of use of the subscriber service by the subscriber. The amplifier and detector 14 may of any conventional type and may be energized by means of the 24-volt alternating-current voltage shown applied by means of conductors 15. As an illustration, a successful amplifier detector and relay activator of this type has involved the use of two stages of transistor RF amplification, a conventional video detector and audio transistor amplifier, not shown, having an output stage for the development of power to operate the relay coil, illustrated to the left of the relay Re.

The percentage of the modulation swinging of the trap tuning in accordance with the present invention through the alternating-current voltage applied through the varactors R1 and R2 is determined by the range of temperature variation or other changing conditions that occur in operation of the system that would otherwise effectively detune the traps and not provide sufficient buzz-like distortion of the sound signal. The picture signal, of course, will always be sufficiently scrambled even with an improperly tuned trap; whereas the sound signals, as before stated, may not be sufficiently masked in view of the requirements of the precise tuning of the traps I and II—which requirement is now obviated in accordance with the modulating technique of the present invention.

While thermal switches S1, S2, S4, etc. have been illustrated, it will be understood that other types of switches may also be used as remote relays, and, indeed, the traps I and II may be modified, as by being designed as a single trap, with modulation effected in the manner of the invention.

Further modifications will also occur to those skilled in this art and all such are considered to fall within the spirit and scope of the invention as defined in the appended claims.

I claim:

1. Television subscriber apparatus having, in combination with a television receiver, subscriber apparatus comprising network trap means tuned to the television picture carrier frequency and having sufficient attenuation when tuned to that frequency to substantially cancel said picture carrier frequency, means for optionally inserting and removing said trap means from the input to the television receiver, thereby to distort the picture signals and to pass the same undistorted, respectively; said trap means comprising voltage-variable impedance means the impedance of which may be changed in response to voltage applied thereto; and means for applying an alternating-current voltage of audio frequency to said variable impedance means while said trap means is inserted in order to produce periodic tuning of the trap means through the picture carrier frequency at the alternating-current audible frequency to effect an audible buzz modulation for masking the sound signal irrespective of temperature-caused and other variations in tuning of the trap means.

2. Television subscriber apparatus as claimed in claim 1 and in which said trap variable impedance means comprises voltage-variable capacitive elements such as diodes and varactors, and the modulation audio-frequency applying means comprises a source of stepped-down mains frequency.

3. Television subscriber apparatus as claimed in claim 1 and in which recording means is provided, operable upon removal of said trap means, to record the undistorted reception by the subscriber.

* * * * *